United States Patent [19]
Fisher et al.

[11] 3,868,125
[45] Feb. 25, 1975

[54] INFLATION SYSTEM FOR VEHICLE CRASH BAG

[75] Inventors: Philip D. Fisher, Fairfax; William H. Sargent, Annandale, both of Va.

[73] Assignee: Atlantic Research Corporation, Fairfax County, Va.

[22] Filed: Apr. 9, 1973

[21] Appl. No.: 349,433

[52] U.S. Cl............ 280/150 AB, 417/184, 417/188
[51] Int. Cl.............................................. B60r 21/10
[58] Field of Search...... 280/150 AB; 417/179, 184, 417/185, 188, 189

[56] References Cited
UNITED STATES PATENTS
| | | | |
|---|---|---|---|
| 3,460,746 | 8/1969 | Green et al. | 417/179 X |
| 3,632,133 | 1/1972 | Hass | 280/150 AB |
| 3,640,645 | 2/1972 | Forsythe | 417/174 |
| 3,773,351 | 11/1973 | Catanzarite et al. | 280/150 AB |

Primary Examiner—Kenneth H. Betts

[57] ABSTRACT

An inflation system for a crash or protective bag installed in any suitable location in a vehicle, such as the dashboard. The inflation system generally comprises an aspirator assembly having a housing in which the crash bag is stored, a plurality of nozzle assemblies positioned within the housing, and gas generating means connected to the nozzle assemblies. The housing comprises telescoping sections, with the crash bag being secured to the outer section which is slidable over the inner section. When the crash bag is stored, the outer section is in its inner position over the inner section such that it and the crash bag are maintained within the confines of the dashboard or other mounting portion of the vehicle. Upon actuation of the gas generating means and flow of gas through the nozzle assemblies, the outer housing section is caused to slide outwardly over the inner section in response to the inflation of the crash bag such that it forms an elongated housing of sufficient length to permit suitable expansion of the gases and rapid flow of the ambient air for inflating the crash bag. When the outer housing section moves outwardly, it exposes openings in the inner housing section through which ambient air may rapidly flow into the housing and the crash bag.

9 Claims, 7 Drawing Figures

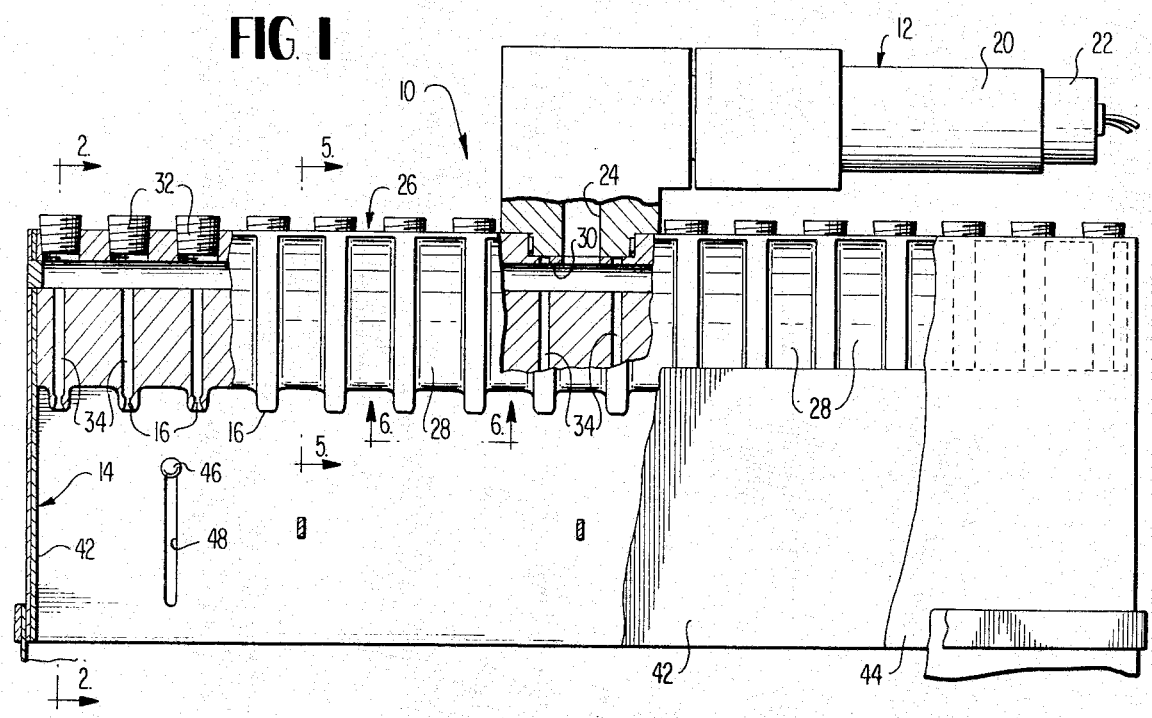
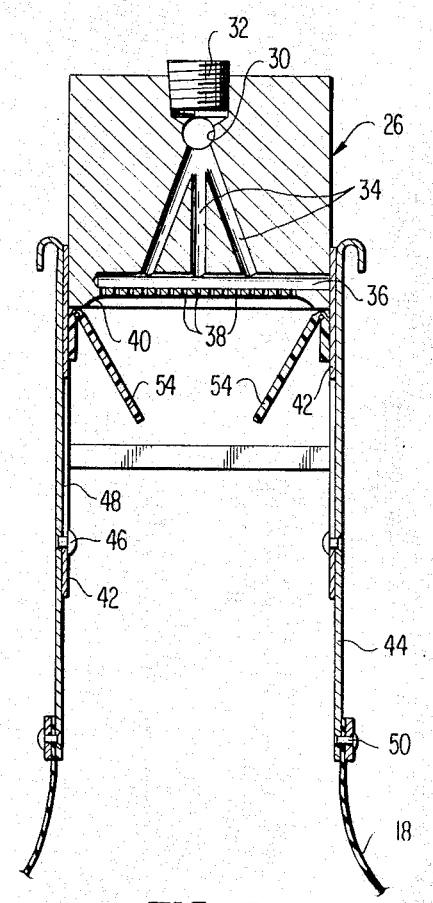
FIG. 1
FIG. 2
FIG. 3

INFLATION SYSTEM FOR VEHICLE CRASH BAG

BACKGROUND OF THE INVENTION

At the present time, a great deal of research and development is being conducted in an effort to develop safety systems for vehicles, particularly safety systems for passenger vehicles such as automobiles. One safety system which is being thoroughly investigated utilizes an inflatable bag which is automatically inflated in response to a predetermined vehicle impact to prevent the occupant from contacting the instrument panel, windshield or other portions of the vehicle. In other words, the bag is inflated during a crash to prevent the occupant of the vehicle from incurring serious injury as a result of impact with the interior of the vehicle body.

It will be appreciated that the time in which the bag must be inflated is very critical and is measured in terms of milli-seconds. Consequently, one of the problems being thoroughly researched is that relating to a suitable means for rapidly inflating the bag in response to vehicle impact. One inflation system that has been proposed utilizes a storage tank or other means in which fluid is stored under pressure for inflating the bag. During the normal operation of the vehicle, the pressure tank is sealed off from the bag. In the event of a predetermined vehicle impact, however, the pressure tank is immediately connected to the bag so that the high pressure fluid within the tank can rapidly inflate the bag. While this system has performed satisfactorily, it possesses the obvious disadvantage of having to provide a storage tank with fluid under pressure in each vehicle having an inflatable crash bag. Since such tanks are bulky, they will add to the space and storage problems already encountered in automobiles, and also will add to the expense thereof.

A second system that has been proposed for inflating vehicle crash bags utilizes gases created by the burning of a gas generating means such as a propellant to inflate the crash bag. While such systems have served to rapidly inflate crash bags, their use of hot combustion gases to inflate the crash bag may cause damage to the crash bag or injury in the form of burns or the like to the occupant of the vehicle making contact with the inflated and heated crash bag. In addition, the combustion gases from the burning of certain propellants may contain toxic components which may be harmful to the respiratory system of the occupant or occupants of the vehicle.

It will be readily seen, therefore, that a need has arisen for a new and improved inflation system for a vehicle crash bag. The inflation system of the present invention fulfills this need in that it is not subject to the disadvantages of the present inflation systems and possesses certain advantages not possessed by the present inflation systems.

SUMMARY OF THE INVENTION

The inflation system of the present invention comprises an aspirator assembly having a housing formed of telescoping sections, a plurality of nozzle assemblies positioned within the housing, and gas generating means connected to the nozzle assemblies. The crash bag is stored in folded condition within the housing when not in use and is secured to an outer section of the housing which is slidably mounted on an inner housing section.

The gas generating means may be of any suitable type and construction, such as a solid grain formed of a non-toxic and non-corrosive gas generating composition which is combustible to produce a gas flow through the nozzle assembly. Each nozzle assembly extends throughout most of the width of the housing, and comprises an elongated, V-shaped groove which serves as an expansion nozzle for a plurality of gas exhaust apertures in communication therewith. The nozzle assemblies are substantially uniformly spaced across the length of the housing so as to produce a maximum gas flow.

When the crash bag is stored in the housing, the outer housing section is in its inner position over the inner section such that it is maintained within the confines of the dashboard or other mounting structure of the vehicle. Upon actuation of the gas generating means in response to a predetermined vehicle impact, a flow of gas through each of the nozzle assemblies is rapidly created. This gas flow into the housing serves to initially inflate the crash bag. As the crash bag begins to inflate, the outer housing section is caused to slide outwardly over the inner section to form an elongated housing of sufficient length to permit suitable expansion of the gas from the nozzle assemblies and to induce a rapid flow of ambient air within the vehicle into the housing for mixing with the combustion gases to rapidly inflate the crash bag. As the outer housing section is moved outwardly, it exposes openings in the inner housing section through which the ambient air may rapidly flow into the housing and the crash bag.

Since ambient air in the vehicle is rapidly mixed with the combustion gases in the housing to inflate the crash bag, the hot combustion gases are cooled and the resulting gas-air mixture will not damage the crash bag or harm the occupant of the vehicle making contact with the crash bag.

BRIEF DESCRIPTION OF THE DRAWINGS

FIG. 1 is a plan view, partly in section and with parts broken away, of an inflation system for a vehicle crash bag or the like, constructed in accordance with the principles of the present invention;

FIG. 2 is a sectional view, with parts broken away, taken substantially along lines 2—2 in FIG. 1, showing the crash bag in folded and stored condition;

FIG. 3 is a view similar to FIG. 2, showing the crash bag in an inflated condition;

DESCRIPTION OF THE PREFERRED EMBODIMENT

Figure 4:
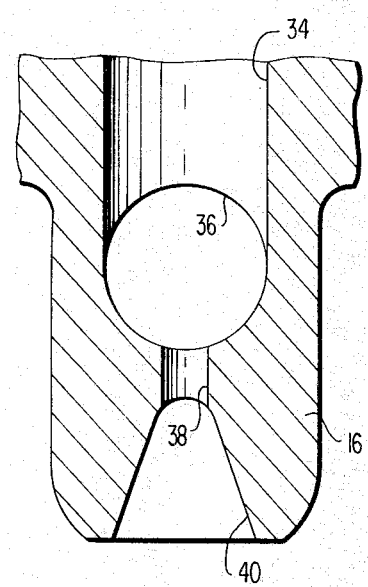
FIG. 4 is an enlarged, partial sectional view, showing a portion of a nozzle assembly of the present invention.

Referring to FIGS. 1 and 2, the inflation system of the present invention generally comprises an aspirator assembly 10 including a gas generating means 12, a housing 14 and a plurality of nozzle assemblies 16. The gas generating means 12 is connected to each of the nozzle assemblies 16 for the purpose of creating gas flow therethrough into the housing 14 in which the inflatable crash bag 18 is stored in deflated, folded condition. The aspirator assembly 10 may be mounted in any suitable portion of the interior of a vehicle (not shown), preferably in the dashboard or other area in front of the passenger to be protected by the crash bag 18.

The gas generating means 12 may be of any suitable or conventional type, and may comprise a solid grain 20 formed of a combustible, non-toxic and non-corrosive gas generating composition, such as that disclosed in application Ser. No. 141,311, filed May 7, 1971, now U.S. Pat. No. 3,723,205. The gas generating means 12 may comprise any suitable or conventional type of ignitor 22 for initiating the combustion of the grain, which may be electrically or otherwise actuated in response to impact of the vehicle in which it is mounted. A bore 24 extends through the gas generating means 12 from the grain 20 to the casing 26 in which the nozzle assemblies 16 are formed.

The casing 26 may be of any suitable construction and preferably is formed or cast of unitary construction and comprises the plurality of nozzle assemblies 16 which are uniformly spaced throughout the length of the casing, and rearwardly and inwardly tapered guide portions 28 between the nozzle assemblies 16 for providing a smooth flow path into the housing 14 in a manner to be described further hereinafter. A primary channel 30 extends through substantially the entire length of the casing 26 and is in communication with the bore 24 in the gas generating means 12. The casing 26 comprises a plurality of threaded openings with plugs 32 in communication with the primary channel 30, and a plurality of secondary channels 34 leading from the primary channel 30 to each of the nozzle assemblies 16.

The secondary channels 34 lead into a transverse bore 36 which is in communication with a plurality of small openings 38 leading into a substantially V-shaped groove 40 for each nozzle assembly. From the foregoing description, it will be readily seen that generated gas from the gas generating means 12 is conveyed to each of the nozzle assemblies 16 via the bore 24, primary channel 30, secondary channels 34, bores 36 and openings 38. The V-shaped groove 40 for each nozzle assembly serves as an expansion nozzle for the gas flowing through each of the openings 38.

The housing 14 comprises an inner section 42 secured to the casing 26 and being spaced from the forward portion of the casing so as to provide an opening through which ambient air may flow along the guide portions 28 between the nozzle assemblies 16 into the interior of the housing. The housing 14 also comprises an outer section 44 that is slidably mounted in telescoping relation on the inner section 42. The sliding movement of the outer section 44 relative to the inner section 42 may be controlled and limited in any suitable manner such as by a rivet 46 connected to the outer section 44 and slidably mounted within a slot 48 in the inner section 42. The outer housing section 44 is movable on the inner section 42 from an inner position shown in FIG. 2, wherein it covers the space or opening between the inner section 42 and the forward portion of the casing 26 to prevent air flow into the housing, to the outer position shown in FIG. 3, wherein the opening between the inner section and the forward portion of the casing 26 is exposed so as to allow air flow along the guide portions 28 into the housing 14.

The crash or protective bag 18 is secured to the outer end of the outer housing section 44 in any suitable manner, such as by rivets 50, and is stored within the housing 14 in a deflated, folded position such as that shown in FIG. 2. The bag 18 may be formed of any suitable flexible material such as Nylon or Dacron which preferably is somewhat porous to allow escape of air therethrough at a predetermined rate as will be described more fully hereinafter.

Figure 7:
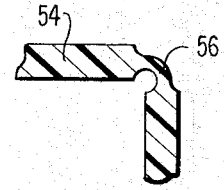
FIG. 7 is an enlarged, partial sectional view of a portion of the flap valve shown in FIG. 2.

Mounted within the housing 14 just rearwardly of the nozzle assemblies 16 is a flat valve 52 extending throughout substantially the entire length of the housing. As shown in FIGS. 2 and 3, the flap valve 52 comprises a pair of flaps 54 that are secured to the inner housing section 42 and are normally disposed in the closed position shown in FIG. 2 wherein the housing is closed to interrupt communication between it and the nozzle assemblies 16 and guide portions 28 of the casing 26. As shown in FIG. 7, each of the flaps 54 may be formed of any suitable material such as a flexible and resilient material, e.g., a suitable rubber or plastic material, and is provided with a narrow hinge portion 56 to facilitate pivotal movement of the flap between the closed position shown in FIG. 2 and the open position shown in FIG. 3.

In use, the aspirator assembly 10 is mounted in any suitable portion of a vehicle such as the dashboard, with the outer housing section 44 in its inner position and the crash bag 18 in its deflated, folded position, as shown in FIG. 2. If desired, the open end of the housing 14 may be closed to cover the folded air bag 18 by any suitable means, such as movable panels, doors or the like (not shown). With the housing section 44 in its inner position, the aspirator assembly 10 occupies a minimum of space and may be readily mounted within a dashboard of a vehicle without extending beyond the normal confines of the dashboard.

When the vehicle is subjected to an impact of predetermined force, the ignitor 22 of the gas generating assembly 12 is actuated to ignite the combustible grain 20, thereby immediately creating a rapid flow of generated gas through the bore 24 to the casing 26. As hereinbefore described, the gas from the bore 24 flows to the nozzle assemblies 16 through the primary channel 30, secondary channels 34, bores 36 and openings 38 in the casing 26. The V-shaped groove 40 of each nozzle assembly 16 serves as an expansion nozzle for the generated gas flowing through the openings 38, and the gas flows from these nozzles into the inner section 42 of the housing 14 in which the crash bag 18 is stored. The flow of generated gas through the nozzles 40 serves to move the flap valves 54 to their open positions shown in FIG. 3 so as to open the housing to this gas flow.

Since the outer housing section 44 is in its inner position, wherein it prevents the flow of ambient air into the housing, the generated gas flowing rapidly into the housing serves to build up sufficient pressure to initially inflate and unfold the crash bag 18 disposed within the housing. This pressure build-up within the housing and initial inflation of the bag 18 causes the outer housing section 44 to slide rearwardly over the inner housing section 42 to the position shown in FIG. 3 wherein the opening or space between the inner housing section 42 and the forward portion of the casing 26 is exposed to open the housing to ambient air flow.

Figure 5:
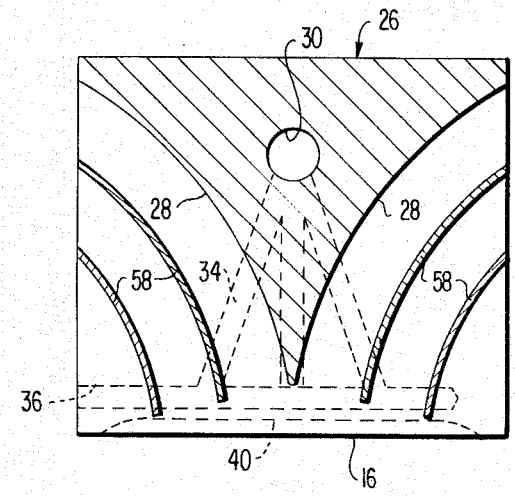
FIG. 5 is an enlarged sectional view taken substantially along line 5—5 in FIG. 1.
Figure 6:
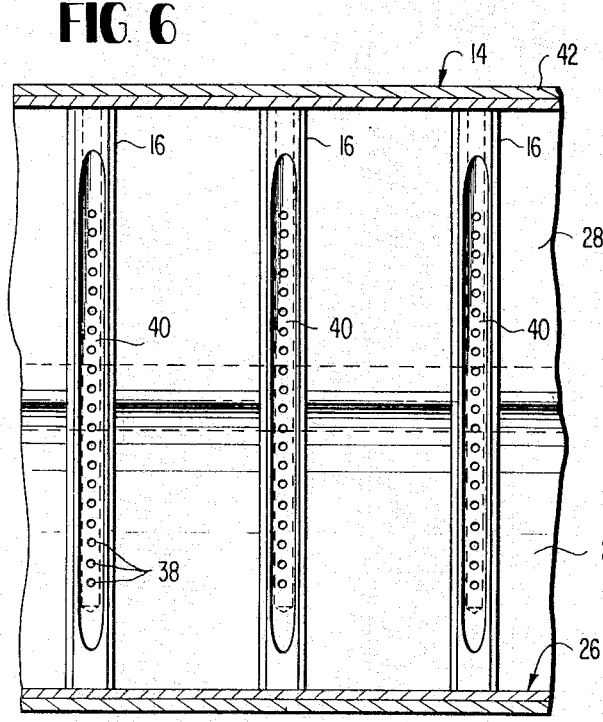
FIG. 6 is an enlarged sectional view, with parts broken away, taken substantially along line 6—6 of FIG. 1.

The rapid flow and expansion of the generated gas into the housing serves to rapidly draw ambient air in the vehicle into the housing through the space or opening between the inner housing section 42 and the forward portion of the casing 26. A smooth and rapid flow of air into the housing is created by the sloped guide portions 28 disposed between the nozzle assemblies 16 of the casing 26. As shown in FIG. 5, the smooth and rapid flow of air into the housing may be further aided by providing curved vanes 58 adjacent the sloped guide portions on the casing 26.

The rapid flow of ambient air into the housing, induced by the generated gas flow through the nozzles 40, serves to rapidly inflate the crash bag 18 in the required time to prevent injury to the vehicle passenger seated behind the crash bag. The rearward movement of the outer housing section 44 serves to provide an elongated housing of sufficient length to allow for adequate expansion and mixing of the hot generated gas with the ambient air, thereby providing a cooled gas-air mixture which is used to rapidly inflate the crash bag 18. In this manner, damage to the bag 18 or to the passenger, caused by hot gases, is effectively prevented.

As the passenger contacts the inflated crash bag, owing to forward momentum, the back pressure created within the housing causes the valve flaps 54 to move to the closed position shown in FIG. 2 so as to prevent the rapid leakage of the air-gas mixture from the housing 14. The inflated crash bag 18 is thus prevented from being rapidly deflated to ensure an adequate cushioning effect on the passenger. To aid the cushioning effect, and to prevent a rebound effect, the crash bag 18 is formed of a porous material which will allow a controlled amount of air-gas leakage therethrough. In this manner, the bag 18 will be gradually deflated at a controlled rate sufficient to provide a cushioning effect on the passenger in the vehicle adequate to prevent injury from the force of the vehicle impact.

What is claimed is:

1. A system for inflating a crash bag in a vehicle, comprising:

an aspirator assembly mounted within the vehicle, said aspirator assembly including:

a. a housing for storing the bag, said housing comprising a first section having an opening therein for admitting ambient air into the housing, and a second section movable relative to said first section for movement between a first position covering said opening and a second position exposing said opening and elongating said housing, said bag being secured to said second housing section, b. a nozzle assembly mounted within said housing, and c. gas generating means connected to said nozzle assembly, whereby when said generating means is activated, generated gas flows through said nozzle assembly into said housing to effect initial inflation of said bag and to cause said second housing section to move from said first position to said second position to enable ambient air to enter said housing through said opening, the elongated housing permitting optimum expansion of the gas and inducing rapid flow of ambient air into said housing.

2. The inflation system of claim 1 wherein there are a plurality of nozzle assemblies, and each of said nozzle assemblies is connected to said gas generating means.

3. The inflation system of claim 2 wherein said nozzle assemblies are substantially uniformly spaced throughout the width of said housing.

4. The inflation system of claim 3 wherein air guide means are provided between said nozzle assemblies adjacent said housing opening.

5. The inflation system of claim 1 wherein said nozzle assembly comprises a plurality of generated gas exhaust apertures terminating in an elongated V-shaped groove which serves as an expansion nozzle for said exhaust apertures.

6. The inflation system of claim 1 wherein said gas generating means comprises a combustible, solid gas-generating composition which is non-toxic and non-corrosive, and means for igniting said composition.

7. The inflation system of claim 4 further comprising valve means in said housing, said valve means being normally disposed in closed position to close said housing and interrupt communication between said housing and said nozzle assembly, and said valve means being movable to an open position in response to flow of generated gas through said nozzle assembly to thereby open said housing and establish communication between said nozzle assembly and said housing.

8. The inflation system of claim 7 wherein said valve means comprises a flexible and resilient flap valve.

9. The inflation system of claim 1 wherein said first housing section is an inner section, and said second housing section is an outer section slidably mounted on said inner section in telescoping relation therewith.

* * * * *